US007058127B2

(12) United States Patent
Lu et al.

(10) Patent No.: US 7,058,127 B2
(45) Date of Patent: Jun. 6, 2006

(54) METHOD AND SYSTEM FOR VIDEO TRANSCODING

(75) Inventors: Ligang Lu, Somers, NY (US); Cesar A. Gonzales, Katonah, NY (US); Jack L. Kouloheris, Ossining, NY (US); Shu Xiao, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 09/748,832

(22) Filed: Dec. 27, 2000

(65) Prior Publication Data

US 2002/0080877 A1 Jun. 27, 2002

(51) Int. Cl.
*H04B 1/66* (2006.01)

(52) U.S. Cl. ........................................ 375/240.06

(58) Field of Classification Search ........... 375/240.01, 375/240.06, 240.16, 240.17, 240.26; 348/405.1, 348/416.1, 417.1; 382/236; H04B 1/66, H04B 7/66; H04N 7/26, 7/12
See application file for complete search history.

(56) References Cited

U.S. PATENT DOCUMENTS

| | | | | |
|---|---|---|---|---|
| 5,805,224 | A * | 9/1998 | Keesman et al. | 375/240.04 |
| 5,870,146 | A | 2/1999 | Zhu | 348/405.1 |
| 5,889,561 | A * | 3/1999 | Kwok et al. | 348/405.1 |
| 5,940,130 | A | 8/1999 | Nilsson et al. | 348/416.1 |
| 5,991,452 | A * | 11/1999 | Shimizu et al. | 382/248 |
| 6,466,623 | B1 * | 10/2002 | Youn et al. | 375/240.16 |
| 6,625,320 | B1 * | 9/2003 | Nilsson et al. | 382/238 |
| 2002/0154698 | A1 * | 10/2002 | Youn et al. | 375/240.17 |

* cited by examiner

*Primary Examiner*—Tung Vo
(74) *Attorney, Agent, or Firm*—Ohlandt, Greeley, Ruggiero & Perle, L.L.P.; Daniel P. Morris IBM Corporation

(57) ABSTRACT

A system for transcoding compressed video signal, including a plurality of pictures, comprising an estimator to gather information and estimate the signal characteristics about the video signal; a decoder to completely or partially decode the compressed video signal; and an encoder to compress the reconstructed video signal according to a coding scheme devised on the estimated signal characteristics from the estimator.

23 Claims, 2 Drawing Sheets

Transcoder
400
Compressed Video Signal
402
Decoder
410
408
Delay
440
Encoder
430
Compressed Video Signal
414
404
Coding Parameters
406
Look-Ahead Estimator
420
412

METHOD AND SYSTEM FOR VIDEO TRANSCODING

BACKGROUND OF THE INVENTION

Field of the Invention

This invention relates to transcoders for converting a signal stream compressed by a first coding scheme to a new signal stream according to a second coding scheme. The invention is particularly suitable for transcoding compressed digital video streams, such as the MPEG video streams.

With the rapid advances in video communication technologies, more and more applications are making use of digital video. It is expected that, in the near future, users will be able to access a wide variety of services that include video on demand, videoconferencing, videotelephony, etc. However, transmitting uncompressed digital video data over long distance requires high bandwidth links and is expensive.

Video compression techniques have been developed to reduce transmission bandwidth with acceptable degradation in the picture quality. While there have been a lot of research efforts in developing new video coding algorithms, currently the most efficient video coding algorithms employ motion compensated prediction and transform coding to reduce the temporal redundancy and exploit the spatial correlation. The gain of motion compensated prediction relies on the assumption that pixel values in a video frame mostly resemble the neighboring pixel valves in an adjacent frame, and relies further on average, that transmitting the prediction errors is more efficient than transmitting the pixel valves.

The motion compensation prediction step involves searching for a block of pixels in the previous reconstructed picture(s), which is the best match to the block being predicted in the current picture. The motion prediction error is then calculated based on a selected distance measure and quantized along with the motion vector, which is the differences between the coordinators of the two blocks. The transform coding involves transforming a block of pixel values or a block of prediction errors into another representation or another set of values in which many coefficients are or near zeros so that greater compression efficiency can be achieved. The most widely used transform for coding is the block based Discrete Cosine Transform (DCT). The block DCT based video coding standards, such as MPEG-1, MPEG-2, H.263, and Motion JPEG are and will likely still be the major digital video coding techniques for various wired and wireless video services and applications. Conventionally, what is known as a macroblock is a 16 by 16 block of pixels; a slice is a row of macroblocks.

Recently, there is an increasing need for the service provider to have effective means that can efficiently transcode pre-compressed high bit rate video streams into lower bit rate streams in real time to meet the different bandwidth requirements of various services or applications. One of the prior art approaches for video transcoding is shown in FIG. 1. First, a decoder decodes the video compressed according to a first coding scheme back to the uncompressed video signal, then, an encoder encodes the reconstructed video signal according to another coding scheme. Another prior art approach is shown in FIG. 2, wherein the compressed video is completely or partially decoded and the motion prediction and compensation parameters used by the first coding scheme are extracted and reused in the second coding scheme.

In order to provide more detailed background, reference may be made to

[1] M. Nilsson, D. Morrison, M. Granbari, "Video Transcoder with By-Pass Transfer of Extracted Motion Compensation Data," U.S. Pat. No. 5,940,130, Aug. 17, 1999.

[2] Q. Zhu, "Device and Method for Digital Video Transcoding," U.S. Pat. No. 5,870,146, Feb. 9, 1999.

SUMMARY OF THE INVENTION

A primary object of the present invention is to provide a system and method for achieving high performance video transcoding; yet low cost video transcoding.

According to one aspect of the invention, there is provided a transcoding system and methodology that comprises an estimator, a decoder, and an encoder. The estimator gathers the information and estimates the signal characteristics of the future incoming pictures to be transcoded, including look ahead into the incoming compressed signal to estimate the signal complexities of the future pictures. The outcome of the estimator is provided to the encoder in order to devise a second coding scheme for encoding the output of the decoder. The decoder, which can be either a complete decoder or a partial decoder, completely or partially decodes the compressed video signal coded according to a first coding scheme. The output of the decoder is either a completely or partially reconstructed video signal, depending on whether a full or partial decoder is used. The reconstructed video signal is then fed to the encoder. The encoder encodes the reconstructed video signal guided by a second coding scheme devised on the basis of the information from the estimator.

If motion compensated prediction is used, the estimator can also gather the motion vector and prediction and picture type information during the decoding and pass the information to the encoder. The encoder can either reuse the motion vectors or derive new motion compensated prediction. For example, if a logo is inserted during the transcoding, the encoder may derive some other motion vectors and motion prediction types for area affected by the logo insertion.

The foregoing and still further objects and advantages of the present invention will be more apparent from the following detailed explanation of the preferred embodiments of the invention in connection with the accompanying drawings:

DETAILED DESCRIPTION OF THE INVENTION

As the present invention may be applied in connection with MPEG-2 video transcoding, it is understood that the invention may also be applied to other coding algorithms that share some features of the MPEG-2 standard, such as MPEG-1, H.263, Motion JPEG, etc.

Figure 1:
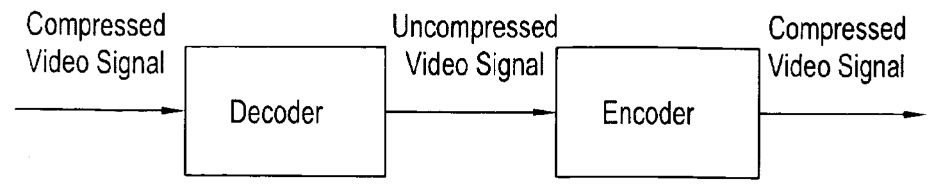
FIG. 1 is a diagram of a prior art transcoder.
Figure 2:
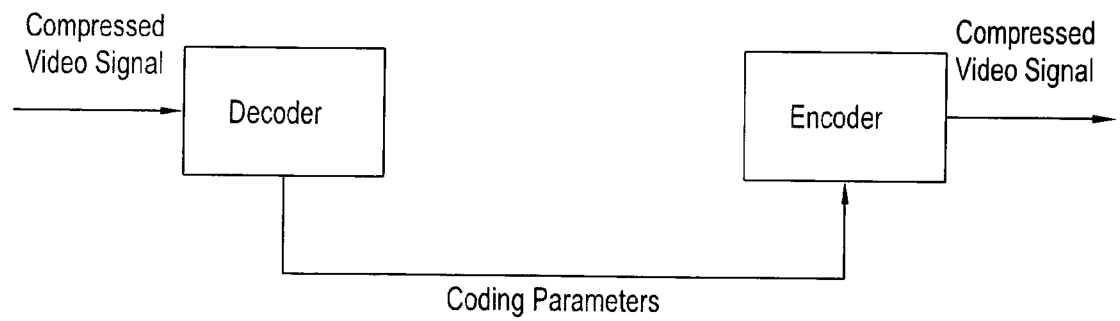
FIG. 2 shows another prior art transcoding scheme.
Figure 3:
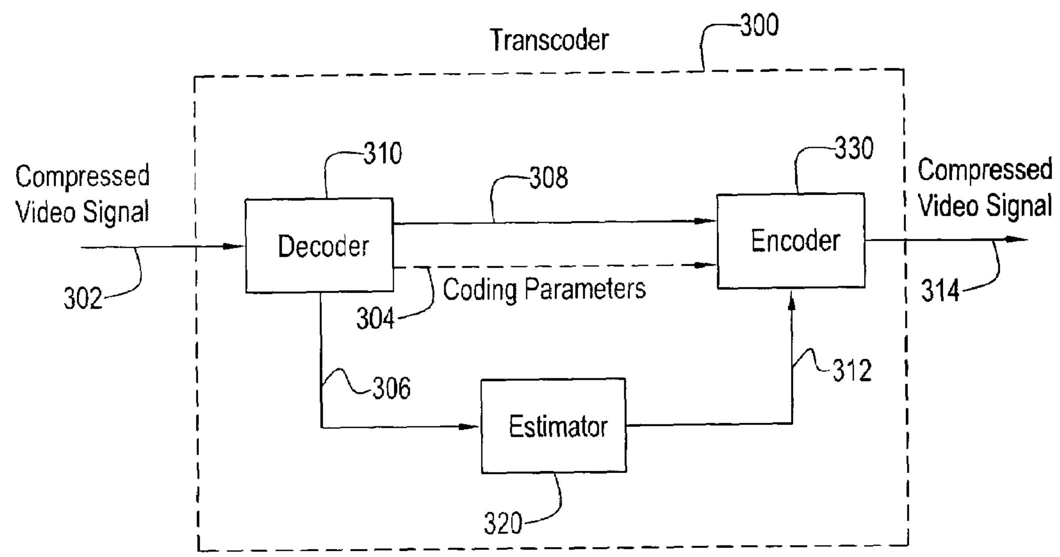
FIG. 3 is a schematic drawing of a transcoder with an estimator according to one embodiment of the invention.

FIG. 3 is the diagram of a transcoding system 300 according to one preferred embodiment of the invention. As shown in the figure, the system 300 includes a decoder 310, an estimator 320 and an encoder 330. Each of the component units of the transcoding system 300 may be embodied in hardware or as software installed in the memory of a computer.

The input to the system 300 is the compressed video signal 302 that is a data stream and compressed by a first coding scheme. The decoder 310 decodes the input signal 302. During the decoding of a picture, the estimator 320 will gather the information 306 needed for estimating the signal characteristics of the current picture. In the preferred embodiment, the estimator derives the current picture complexity using the input information and an estimation model. The output 308 of the decoder 310 is either a fully reconstructed picture or partially reconstructed picture depending on whether a full decoder or a partial decoder is used. The decoder 310 also may or may not pass to the encoder 330 the coding parameters 304 used in coding the current picture by the first coding scheme. In the preferred embodiment, the motion vectors and prediction mode and picture coding type of the current picture are passed to and reused by the encoder 330 so that very significant computation in motion estimation can be saved to achieve low cost but high performance transcoding. The encoder 330 uses the signal characteristics 312 from the estimator 320 to decide a coding scheme for encoding the signal 308 of the current picture. The encoder 330 may also decide whether to reuse any of the coding parameters 304 of the first coding scheme if they are forwarded from the decoder. The output 314 of the encoder 330 is another data stream of the compressed video signal.

Figure 4:
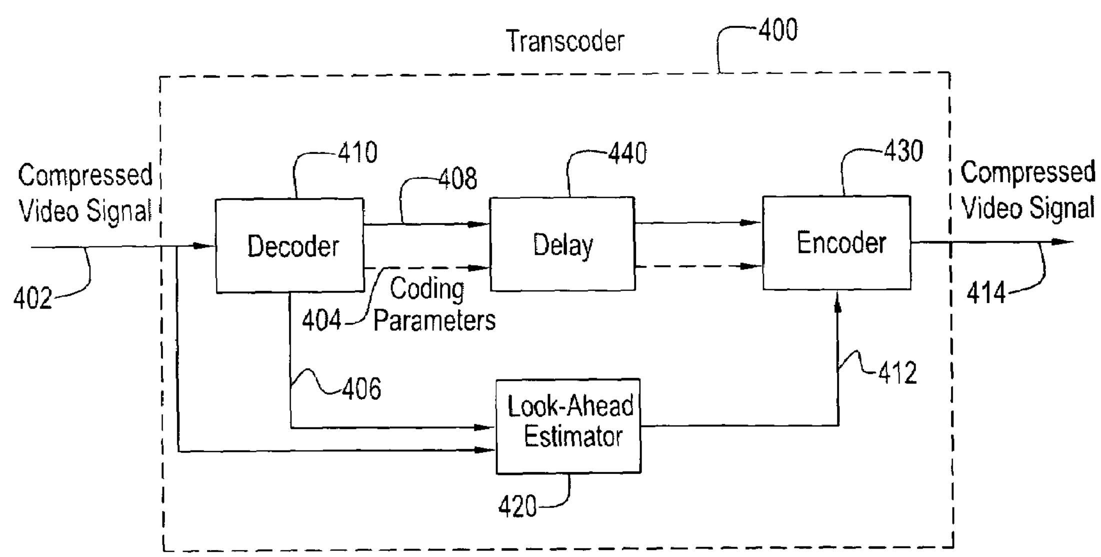
FIG. 4 shows a schematic drawing of a transcoder with a look-ahead estimator according to a second embodiment of the invention.

FIG. 4 is the diagram of a transcoding system 400 according to another preferred embodiment of the invention. As shown in the figure, the decoder 410 fully or partially decodes the input 402 depending on a full or a partial decoder is employed. The look-ahead estimator 420 collects the information from both the input compressed video signal 402 and the decoder 410 to estimate not only the signal characteristics of the current picture but also the signal characteristics of the future incoming pictures. It is advantageous for the encoder 430 to know the signal characteristics of the future incoming pictures so that it can derive a better coding scheme for encoding the current picture. For example, knowing the complexities of the current and future incoming pictures, the encoder can allocate the bits to encode the current picture wisely so that the over all visual quality of the reconstructed pictures can be optimized. The encoder 430 determines a coding scheme based on the signal 412 for encoding the delayed signal of the current picture 408. It may also decide whether to reuse any of the coding parameters of the first coding scheme. In the preferred embodiment, the encoder reuses the motion vectors, prediction mode, and picture type so that low cost high efficient video transcoding can be achieved.

Besides estimating the signal characteristics at the picture levels, the estimators in both FIG. 3 and FIG. 4 can also estimate the signal characteristics of each portion of the picture, such as each slice or macroblock level. It is also very advantageous for the encoder to know the signal characteristics of various portions of a picture so that it can derive a coding scheme accordingly. For example, knowing the complexities of each portion of the picture, the encoder can optimally allocate bits to encode each portion. In the preferred embodiment, the estimator also derives the signal complexity for each macroblock of the picture and the encoder uses the information of the macroblock complexity in coding the picture.

Having thus described our invention, what we claim new, and desire to secure by Letter Patent is:

1. A system for transcoding compressed video signals, including a plurality of pictures, comprising:

a decoder to completely or partially decode an input compressed video signal, a look-ahead estimator to gather information from said input compressed video signal prior to input to said decoder to estimate future signal characteristics of one or more future incoming pictures, and to gather information from said decoder to estimate current signal characteristics of a current picture; and an encoder to compress the reconstructed video signal according to a coding scheme derived from said current and future signal characteristics from said look-ahead estimator.

2. The transcoding system according to claim 1, wherein said look-ahead estimator derives a complexity of said current picture being transcoded.

3. A transcoding system according to claim 2, wherein said picture complexity is estimated by a function of the total bits and the average quantization step size used to code the picture in the first coding scheme.

4. A transcoding system according to claim 2, wherein said picture complexity is estimated by a function of the total bits and average quantization step size used to code the portion of the picture in the first coding scheme.

5. The transcoding system according to claim 1, wherein said look-ahead estimator estimates a complexity of each portion of said current picture.

6. The transcoding system according to claim 5, wherein said portion is a slice of said current picture.

7. The transcoding system according to claim 5, wherein said portion is a macroblock of said current picture.

8. A method for video transcoding, comprising:

decoding, at least partially, a compressed video signal to produce an at least partially reconstructed video signal, said compressed video signal being a data stream coded by a first coding scheme;

determining a current picture complexity for at least a portion of a current picture in said at least partially reconstructed video signal;

looking ahead to estimate complexities of one of more future pictures or portions thereof, said future pictures in said compressed video signal prior to input to said decoder;

selecting a second coding scheme based on said current picture complexity and said future picture complexities; and encoding said current picture using said second coding scheme and said current picture complexity.

9. The method according to claim 8, further comprising: determining current signal characteristics for said current picture; and using said current signal characteristics in selecting said second coding scheme.

10. The method according to claim 9, further comprising using said current signal characteristics in encoding said current picture.

11. The method according to claim 8, further comprising:

determining a future picture complexity for at least a portion of a future picture;

using said future picture complexity in selecting said second coding scheme; and using said future picture complexity in encoding said current picture.

12. The method according to claim 8, further comprising:

determining a future picture complexity for at least a portion of a future picture;

using said future picture complexity in selecting said second coding scheme;

determining future signal characteristics for said future picture; and using said future signal characteristics in selecting said second coding scheme.

13. The method according to claim 12, further comprising using said future signal characteristics in encoding said current picture.

14. The method according to claim 8, wherein said portion of said future picture is a slice.

15. The method according to claim 8, wherein said portion of said future picture is a macroblock.

16. The method according to claim 15, further comprising determining a macroblock complexity for said macroblock; and using said macroblock complexity in selecting said second coding scheme.

17. The method according to claim 16, further comprising using said macroblock complexity in encoding said current picture.

18. The method according to claim 16, wherein said macroblock complexity is determined by a function of total bits and an average quantization step size used to code said data stream.

19. The method according to claim 16, wherein said macroblock complexity is determined by a function of total bits and an average quantization step size used to code said macroblock.

20. The method according to claim 8, wherein said current picture complexity is determined by a function of total bits and an average quantization step size used to code said data stream.

21. The method according to claim 8, further comprising:

determining a future picture complexity for at least a portion of a future picture; and using said future picture complexity in selecting said second coding scheme;

wherein said future picture complexity is determined by a function of total bits and an average quantization step size used to code said data stream.

22. The method according to claim 8, wherein said current picture complexity is determined by a function of total bits and an average quantization step size used to code said portion.

23. The method according to claim 8, further comprising:

determining a future picture complexity for at least a portion of a future picture; and using said future picture complexity in selecting said second coding scheme;

wherein said future picture complexity is determined by a function of total bits and an average quantization step size used to code said portion.

* * * * *